April 1, 1930.     M. B. GROUT     1,753,187
WINDING MACHINE
Filed July 1, 1925     3 Sheets-Sheet 1

Patented Apr. 1, 1930

1,753,187

UNITED STATES PATENT OFFICE

MARTIN B. GROUT, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS

WINDING MACHINE

Application filed July 1, 1925. Serial No. 40,823.

My invention relates to winding machines which are used for winding a material, such as a strand of wire, into electromagnet coils, and has to do more particularly with a coil winding machine such as is used in the winding of a wire upon a suitable spool to serve as a coil for an electromagnet, and an object of my invention is to provide a machine of the above type which is simple in construction, and by which the work of winding an electromagnet coil may be done in a rapid, efficient and economical manner.

Winding machines of the above type are provided with a distributing bar or reciprocating shaft to which is secured a distributing arm which distributes the wire from a source of supply from left to right, and vice versa. The travel of the reciprocating shaft is controlled by a suitable train of gearing and cam mechanism to place the required number of convolutions on a spool supported on a winding spindle. The machines of the above type are also known in the art as single winding machines for the reason that one electromagnet coil is wound at a time and by reason of a predetermined combination of gears which form the train of gearing only one certain size or gauge of wire can be used to wind a certain size coil. To use a machine of this type for winding an electromagnet coil of a different size or gauge of wire, it is necessary to change certain gears of the train of gearing to accommodate this gauge wire so that the distributing bar or reciprocating shaft may place the required number of convolutions of wire per layer on the spool. It is readily seen that a machine of this type to be used for winding different gauges of wire would necessitate a plurality of sets of gears of different pitch diameters and to change from one gauge of wire to another, one set of gears would be removed and another set inserted, which means delays and decrease in production.

To overcome this frequent changing of gears to accommodate different gauges of wire, I provide a plurality of sets of gears rotatably supported by means of hangers which are pivotally supported on a supporting rod and through the medium of a suitable lever any one of the hangers may be moved to place the gears rotatably supported by this particular hanger into engagement with a gear secured to a rotatable shaft, and on which shaft I provide as many gears as there are combinations of gears supported by these hangers. This feature provides means whereby to change from one gauge of wire to another to wind a coil of a predetermined number of convolutions per layer, all that is necessary is to move the lever in association with the hanger, which rotatably supports a set of gears, to place the set of gears of this hanger into engagement with the gear on the rotatable shaft associated with this particular set of gears. When the gears are thus positioned and in mesh with each other, the distributing bar or reciprocating shaft will be moved through the agency of this particular train of gearing and can place the required number of convolutions on the spool for this particular gauge of wire. By this arrangement it will be seen that the member which guides the strand of wire may be made to move longitudinally different distances for equal numbers of turns of the winding spindle. Stated in a different manner the pitch of the feed of the guide member may be changed for different sized wire.

Another feature of my invention is the novel means provided for supporting the hangers which rotatably support the several combinations of gears and the means provided in the form of a gear shift lever which is slidably supported so that the same may be placed in position with any of the hangers to move the gears rotatably supported thereby into engagement with a gear on the rotatable shaft.

The above features of my invention, as well as others, will be more fully hereinafter described, and for a more complete understanding of my invention reference may be had to the accompanying drawings in which like reference characters in the several views denote like parts and in which.

Referring now more in detail to my invention as illustrated in the accompanying drawing, the winding machine comprises a suitable enclosing casing or housing 2 which encloses the mechanism of the winding machine of my invention.

A spindle shaft 3 has secured thereto a pulley wheel 4 which is connected to a power shaft through the agency of a suitable belt, the said power shaft being in turn connected to a suitable starting and stopping means, and, as the power transmission for starting the spindle shaft 3 forms no part of my invention, it is not shown in the drawings. The ends 5 and 6 of the housing 2 are provided with counter bores through which the spindle shaft 3 extends, and ball bearings are provided which rest in the counter bores in the ends 5 and 6 of the housing 2, and rotatably support the spindle shaft 3. A lock nut 13 is provided which has screw-threaded engagement with the threaded portion 14 of the spindle shaft 3, and a collar 15 fits loosely on the shaft 3, and rests in a counter bore 8. An adjustable member 16 provided with a central orifice 17 is slipped on the spindle shaft 3, and its extended body portion 17' is threaded and is adapted to have screw-threaded engagement with a suitable tapped orifice 18 in the housing 2. The lock nut 13 when threaded in position on the shaft 3 engages the ball race 20 and the collar 15 and lock nut 13 retain the ball bearing 10, as a whole, in the counter bore 8, and the adjustable member 16 engaging the collar 15 may be adjusted in its tapped orifice 18, and through the agency of the loose collar 16, any lateral movement of the spindle shaft 3 may be taken up. The chuck K, which supports the electromagnet spool on the winding spindle 3, is secured to the threaded end of the spindle shaft 3. The pulley wheel 4 is secured to the spindle shaft 3 and is provided with an integrally formed flange to which is secured, by suitable means, a knob 26 for causing the manual rotation of the winding spindle 3.

Mounted on a rotatable shaft is a cam member 28, which is tubular in form, and is provided with a pair of receding helical faces 29 and 30. A collar 31 of a size to receive the tubular cam member 28 supports the cam member 28, which is secured thereto by means of screws which pass through suitable orifices in the peripheral face of the cam member 28. The collar 31 is provided with a central orifice for receiving a shaft 33 to which the collar 31 and its supported cam member 28 are secured, as a whole, in any suitable manner, as by means of a key or a set screw. The shaft 33 which supports the collar 31 and the cam member 28, as a whole, is rotatably supported by a pair of bearings 34 and 35 secured to the housing 2 by means of screws 36 and 36'.

A rocker arm 38 is provided, which comprises a pair of rectangular shaped plate members 40 and 41, each of which is provided with a pair of integrally formed lug extensions 42 and 43, which, when the halves 40 and 41 are placed together register with each other, and suitable screws secure the members 40 and 41 together to form said rocker arm 38. An opening 50' is formed between the lug extensions 42 and 43 when the members 40 and 41 are thus assembled, and this opening is of a size to receive the head of the sliding member 37 which is provided with a pair of orifices which receive pivot pins 39 to pivotally support the rocker arm 38, on the member 37. The sliding member 37 is provided with a central orifice through which the shaft 33 extends and upon which the sliding member 37 and its pivoted rocker arm 38, as a whole, are slidably supported.

The end of the shaft 33 which extends through the bearing 34 has secured to it a bevel gear 50 which meshes with a bevel pinion 52, secured to a transverse shaft 53, which shaft 53 is rotatably supported in suitable bearings in the front wall 54 of the housing 2 and the rear removable cover 55. Gear wheels 56, 56' and 56² are spaced along the shaft 53 and secured thereto in any suitable manner for purposes such as will presently be described. Another transverse shaft 57 is rotatably supported in suitable bearings in the front wall 54 of the housing 2, and the removable cover 55. The shaft 57 has secured thereto pinions 58, 58' and 58², and a worm gear 59, also for purposes as will more fully hereinafter be described. Three U-shaped hangers 60, 61 and 62 are pivotally supported on the transverse shaft 57, and as each of the hangers are of the same construction, and rotatably supported on the transverse shaft 57 in the same manner, a description of one will suffice. The end faces of the legs 60' and 60² of the U-shaped hanger 60 are each provided with a semi-circular groove 63, and a pair of yokes 64 are provided whose under faces are provided with semi-circular grooves 64′. The said grooves 64′ and the semi-circular grooves 63 in the end of the legs 60′ and 60² form orifices of a size to receive the transverse shaft 57. The yokes 64 are provided with orifices 65 which are adapted to receive screws 66 which have screw-threaded engagement with the suitable tapped orifices 67 in the ends of the legs 60′ and 60² of the U-shaped hanger 60 and the yokes 64 when thus secured pivotally support the U-shaped hanger 60 on the transverse shaft 57. The pinions 58, 58′ and 58² on the shaft 57 rest respectively between the legs 60′ and 60², 61′ and 61², and 62′ and 62² of the hangers 60, 61 and 62, and as these pinions 58, 58′ and 58² are secured to the transverse shaft 57 they prevent movement of the pivoted hangers along the shaft 57.

The hangers 60, 61 and 62 pivotally secured to the shaft 57 are held in their normal position against a stop 68 which is in the form of a plate and which is supported on a rod 69, which rod is secured in an orifice in a boss 70, integrally formed with the housing 2, by means of a drive fit. The hangers 60, 61 and 62 are provided with depending pin members 71, 72 and 73 which form anchor means for one end of the springs 74, 75 and 76, the other ends of the springs 74, 75 and 76 being anchored to the rod 69, and these springs hold the hangers 60, 61 and 62 in their normal position against the stop 68.

A compound gear which comprises gear wheels 77 and 78 is secured to a stub shaft 79 which is rotatably supported in aligned orifices 80 in the legs 60′ and 60² of the hanger 60. The gear wheel 77 meshes with the pinion 58 on the transverse shaft 57 and the gear wheel 78 of the compound gear is adapted to be moved into engagement with the gear wheel 56 on the transverse shaft 53 for purposes as will presently be described. A gear wheel 81 is secured to a stub shaft 82 which is rotatably supported in aligned orifices 83 in the legs 61′ and 62² of the hanger 61. The gear wheel 81 meshes with the pinion 58′ on the transverse shaft 57 and is adapted to be moved into engagement with the gear wheel 56′ on the transverse shaft 53 for purposes as will presently be described. A gear wheel 84 is secured to a stub shaft 85 which is rotatably supported in the aligned orifices 86 in the legs 62′ and 62² of the hanger 62 and the gear wheel 84 thus rotatably supported meshes with the pinion 58² on the transverse shaft 57 and is adapted to be moved into engagement with the gear wheel 56² on the transverse shaft 53 as will presently be described.

The spindle shaft 3 has a worm portion 87 cut thereon which meshes with the worm gear 59 secured on the transverse shaft 57 to which the pinions 58, 58′ and 58² are secured. Now as the spindle shaft 3 is rotated, the worm 87 which meshes with the worm gear 59, causes rotation of the worm gear 59 and the shaft 57 and the pinions 58, 58′ and 58² thereon. The rotation of the pinions 58, 58′ and 58² causes rotation respectively of the gear wheels 77 and 78 of the compound gear supported by the hanger 60, gear wheel 81 rotatably supported by the hanger 61 and gear wheel 84 rotatably supported by the hanger 62. To move the rotatable gear wheels 78, 81, and 84 into engagement with their associated gear wheels 56, 56′ and 56² on the shaft 53, I provide a suitable gear shifting lever L as will now be described.

A rod 90 is provided and is suitably secured to the front wall 54 of the housing 2. The lever L is provided with a body portion 91 and a sleeve extension 92 which are provided with an orifice of a size to permit the same to be slid crosswise on the rod 90. The lever L is thus pivotally and slidably supported on the said rod 90. The lever L is also provided with an upwardly extending portion 90′ which projects through a transverse slot 93 in the top of the cover cap 55. The side 94 of the slot 93 is provided with three notches 96, 97 and 98, positioned in relation to the hangers 60, 61 and 62 so that when the lever extension 90′ is moved into notch 96 for example, the lever extension will be placed into position to engage the hanger 60 for purposes as will presently be described. The protruding end 90′ of the lever L slidably supports a trigger member 99 which may be moved up or down on the lever rod 90′ a limited distance, the said trigger 99 being limited in its upward movement by a pin 100 secured to the lever extension or rod 90′. The trigger 99 is operatively associated with the slot 93 and notches 96, 97 and 98 therein and when the lever L is in the position shown in Fig. 7 it may be moved along the slot 93 to place it in position to permit the lever extension to be moved into any of the notches 96, 97 or 98, the said lever L sliding along its supporting rod 90 as before described. The three notches 96, 97 and 98 in the slot 93, provide three operative positions A, B and C so that when the lever L is moved into the notch 96 it is in its position A to engage the hanger 60 to move the gear 78 rotatably supported thereby into engagement with the gear wheel 56 on the shaft 53. When the lever is moved into the notch 97 it is in its position B to engage the hanger 61 to move the gear wheel 81, rotatably supported thereby, into engagement with the gear 56′ on the shaft 53 and when moved into notch 98 it is in its position C to engage the hanger 62 to move the gear wheel 84, rotatably supported thereby, into engagement with the gear wheel 56² on the shaft 53. The trigger 99 is provided with a lug 101 integrally formed therewith which when the lever L is moved into a notch registers with the slot 93 and permits the trigger 99 to move down to permit the lug 101 to rest in the slot 93 to hold the lever L in its operative position, all of which will be more fully hereinafter described.

The winding machine of my invention is provided with a revolution counter R for the usual purposes and through the agency of a worm gear 102 in mesh with the worm 87 on the spindle shaft 3 and a train of gearing, the indicators 103 and 104 will indicate the number of convolutions of wire that have been placed on the spool supported by the chuck K on the spindle 3. As the revolution counter forms no part of my invention, a detailed description of the same will not be given, but for a complete description of its construction and operation reference may be had to a co-pending application of mine, filed October 16, 1924, and bearing Serial No. 743,953.

The rocker arm 38 which is pivotally supported upon the sliding member 37 is associated with adjustable means which controls the length of the stroke of the distributing bar or reciprocating shaft 112, upon which the distributing arm D is secured, the reciprocating shaft 112 being secured to the rocker arm 38 and through the medium of this adjustable means coils of various lengths may be wound, as will be described. The rectangular plates 40 and 41 which form the rocker arm 38 are provided with depending members 113 which, when the plates 40 and 41 are secured together, form a depending leg 115, which is provided with a slot 116. A lever 117 pivoted intermediate of its ends by means of a pivot pin 118 secured to the housing 2 cooperates with the rocker arm 38 for adjusting the length of stroke of the distributing bar 112. The end 119 of the pivoted lever 117 is provided with an arcuate face, provided with teeth 121 which mesh with a pinion 122 integrally formed upon a rod which extends through an orifice in a boss formed integrally with the housing 2, and its protruding end has pinned to it a knob 125 which may be turned to rotate the pinion 122 which is in mesh with the toothed rack 121 on the arcuate face of the end 119 of the lever 117. The end 126 of the lever 117 is bifurcated and straddles a stud 127, which extends through a slot 129 in the housing 2 and the protruding end of the stud 127 is threaded to receive a knob 131 which is used for clamping purposes. The knob 131 which is threaded upon the end of the stud 127 which protrudes through the slot 129 in the housing 2, when turned down locks the stud 127 in its adjusted position, which adjustment is obtained through the agency of the lever 117 and knob 125, secured to the rod which is provided with the pinion 122, which meshes with the toothed rack 121 on the lever 117.

Figures 4, 5, 6:
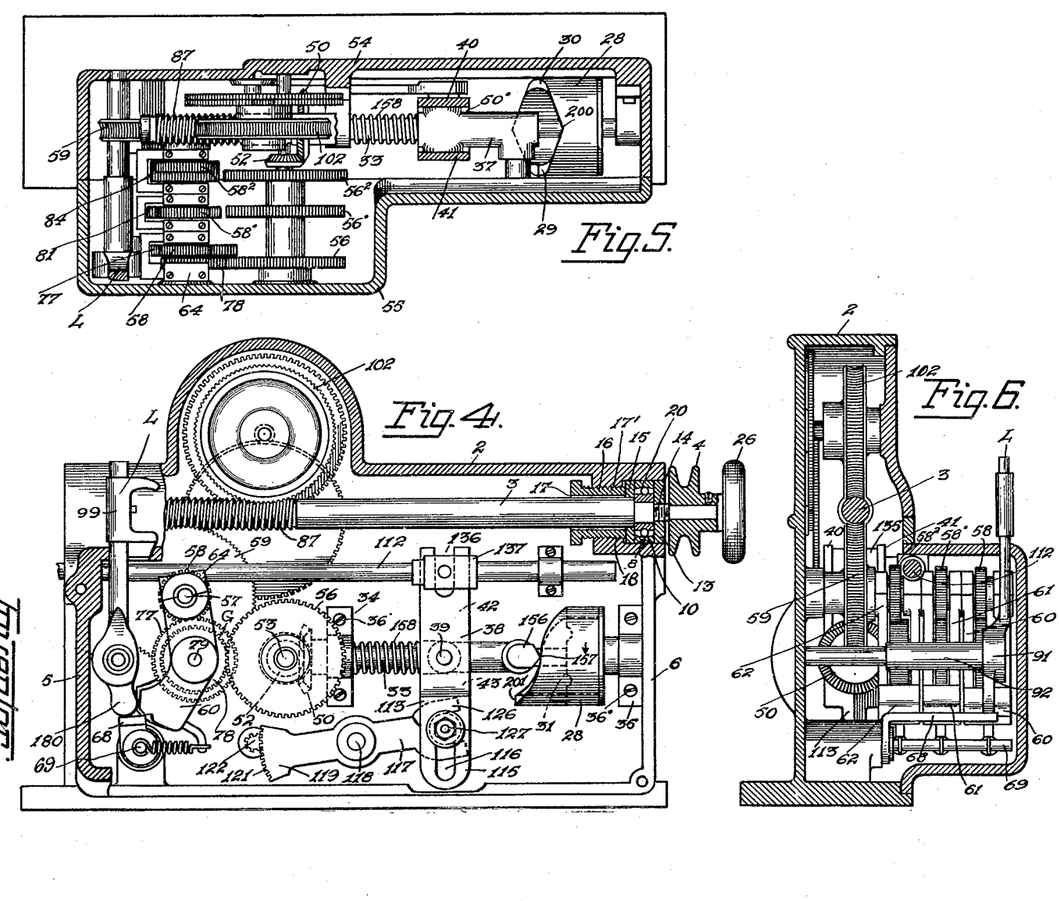
Fig. 4 is a rear view of Fig. 1 with the cover plate removed and parts in section to more clearly illustrate the interior mechanism.
Fig. 5 is a sectional view of the winding machine looking down into the interior with the enclosing casing in section to illustrate another view of the mechanism.
Fig. 6 is a vertical section of the winding machine with the enclosing casing in section to illustrate another view of the mechanism.

The upper end of the rocker arm 38 which is adapted to move from left to right and vice versa supports a block 135 which rests between the upper ends of the plates 40 and 41 which comprise the rocker arm 38. This block 135 is provided with pin extensions which rest in slots 136 in the plates 40 and 41 of the rocker arm 38 and these pin extensions support shoes which rest in channels in the front plate 54 of the housing 2 and the removable cover cap 55. In Fig. 4 the shoe 137 is shown to which the distributing bar or reciprocating shaft 112 is secured and which extends through an aligned orifice in the side of the housing 2 to which the distributing arm D is secured. The function of the block 135 resting between the plates 40 and 41 of the rocker arm 38 and its supported shoes which are adapted to slide horizontally in a to and fro direction in association with the rocker arm 38 are fully described in my copending application as above described and for a full understanding of the operation of the rocker arm 38 in association with the block 135 which permits this horizontal to and fro movement, reference may be had to the above-entitled application.

The rocker arm 38 and the sliding member 37, to which the rocker arm 38 is pivotally secured, are slidably supported on the shaft 33 which has secured to it by suitable means, a cam follower member 156 which is provided with a knife edge nose 157, which is held in engagement with either of the faces 29 and 30 of the cam member 28, depending upon the position of the cam member 28, by means of a helical spring 158 around the shaft 33 which rests between the bearing 34 which supports the shaft 33 and the sliding member 37 on the shaft 33.

Figures 1, 2, 3:
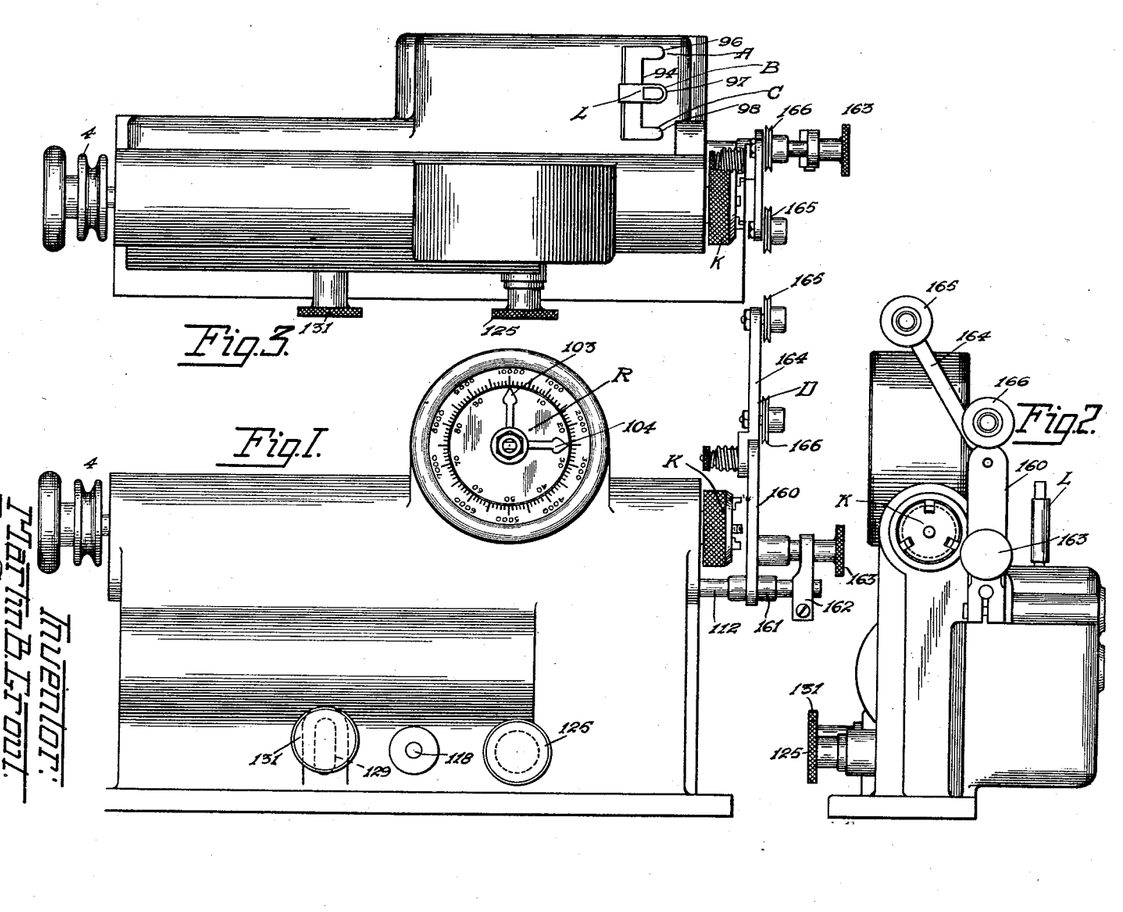
Fig. 1 is a front elevation of the winding of my invention illustrating the distributing arm in an intermediate position.
Fig. 2 is a right side elevation of the winding machine.
Fig. 3 is a plan view of Fig. 1.

The distributor arm D is illustrated in Figs. 1, 2, and 3 and is secured to the reciprocating shaft 112 and comprises a plate 160 secured to a bushing 161 slidably supported on the reciprocating shaft 112. A clamping member 162 is secured to the reciprocating shaft 112 and carries a knob 163 which through the agency of a suitable threaded member moves the arm D along the shaft 112 to the right or left for adjustment purposes. The plate member 160 has pivotally secured to it an arm 164 which supports a pair of ball bearing guide wheels 165 and 166 for the usual purpose of guiding the wire from the source of supply to the coil secured to the chuck K. The chuck K for gripping the electromagnet spool is secured to the spindle shaft 3, and may be of any desired or apparent type. Its construction depending upon the character of the spool which it holds for winding purposes.

The removable cover cap 55 is secured to the housing 2 by suitable screws which have screw-threaded engagement with suitable tapped orifices in the housing 2 and this cover cap 55 may be removed to permit access to the mechanism of the machine. The housing 2 is also provided with a suitable base and the machine may be secured to a suitable table and a strand of wire from a suitable source of supply lead over the guide wheels 165 and 166 on the adjustable arm 164 of the distributor D to the spool to be wound.

Figure 7:
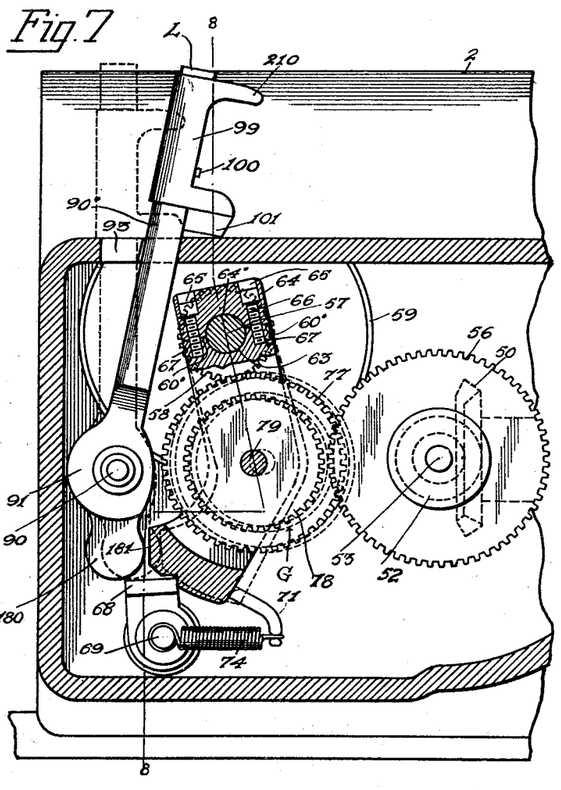
Fig. 7 is a full size fragmentary view of the gear change with the gear shifting lever disengaged from hangers rotatably supporting the gear changes.
Figure 8:
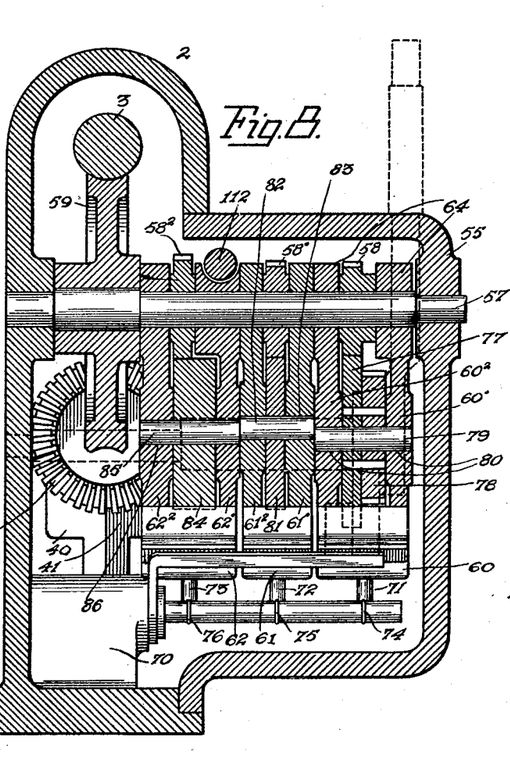
Fig. 8 is a sectional view along the line 8—8 of Fig. 7 which view clearly illustrates the construction of the gear change mechanism.

Having described the apparatus through the agency of which the cam member 28 is rotated, and the apparatus associated therewith, I will now describe the operation of the winding machine to cause the movement of the reciprocating shaft 112 from left to right and vice versa. Now when the clutch pedal of the power drive (not shown) is actuated, the belt connection between the source of power and the pulley wheel 4 on the spindle shaft 3 will rotate the spindle shaft 3. The worm 87 on the spindle shaft 3 meshes with the worm gear 59 on the transverse shaft 57, causing rotation of the pinions 58, 58' and 58² on the transverse shaft 57 and the gears 77, 81, and 84 rotatably secured to the hangers 60, 61 and 62. The gear changing lever L when in the position shown in Fig. 7 is in its neutral or normal position and disengaged from all of the hangers 60, 61 and 62 and as before described they are held in their normal positions by the springs 74, 75 and 76. In normal position the rotatably supported gears 78, 81 and 84 of the hangers 60, 61 and 62 are disengaged from the gears 56, 56' and 56² on the transverse shaft 53. To move the lever L into its position A to engage the hanger 60 which rotatably supports the compound gear G which comprises the gears 77 and 78, the lever L is moved along its supporting rod 90 with its protruding end or lever rod 90' moving in the slot 93 in the cover cap 55. When the lever rod 90' is opposite the notch 96 in the slot 93 the lever L may be moved to the left with reference to Fig. 7. This movement of the lever L to the left to place it in the notch 96 causes the depending member 180 integrally formed with the body of the lever 91 to move to the right with reference to Fig. 7 to engage the face 181 of the hanger 60 which pivotally supports the gears 77 and 78 of the compound gear G. This movement of the depending member 181 to the right also moves the hanger 60 pivotally supported on the transverse shaft 57 to the right against the normal tension of the spring 74 to cause the rotating gear 78 of the compound gear G rotatably supported by the hanger 60 to engage or mesh with the gear 56 on the transverse shaft 53. When the lever rod 90' enters the notch 96 in the slot 93, the trigger 99 is permitted to move down on the lever rod 90' allowing the lug 101 on the trigger 99 to enter the slot 93 and lock the lever L in its actuated position maintaining the gear 78 of the hanger 60 in mesh with the gear 56 on the shaft 53 and the position of the lever L when the gear 78 is in mesh with the gear 56 on the transverse shaft 53 is illustrated in dotted lines in Fig. 7. The rotating gear 78 in mesh with the gear 56 on the transverse shaft 53 now rotates the transverse shaft 53 and causes the bevel pinion 52 secured thereto to rotate and it being in mesh with the bevel gear 50 on the shaft 33 rotary motion is transmitted to the shaft 33 which carries the cam member 28 and causes the same to rotate.

In the drawings I show the reciprocating shaft 112 in an intermediate position, that is, halfway between its end positions and with reference to Fig. 4, the arrow indicated on the cam member 28 indicates the direction of travel of the cam member 28 and with this direction of travel, the reciprocating shaft 112 is travelling to the right with reference to Fig. 4.

As the cam member 28 rotates the nose 157 of the cam follower member 156 follows the contour of the receding pitch face 29 of the cam member 28, and through the agency of the helical spring 158 which bears against the sliding member 37, the said member 37 and its pivotally supported rocker arm 38, as a whole, continue their travel to the right with reference to Fig. 4, but as the stud 127 which is used for adjusting the length of stroke of the reciprocating shaft 112 passes through the slot 116, in the depending leg 115 of the rocker arm 38, as before described, is locked in its adjusted position in the slot 129 in the housing 2 by means of the locking knob 131, the rocker arm 38 rocks about this point and pivots about its pivot pins 39 in the sliding member 37 and causes the upper end of the rocker arm 38 to tilt to the right. The shoes supported on the block 135 resting in the upper end of the rocker arm 38 now slide to the right in their respective channels and the tilting of the upper end of the rocker arm 38 to the right in a downward direction is permitted, due to the fact that the studs of the block 135 which support the same in the rocker arm 38 rest in the bifurcated ends of the rocker arm 38, and at the same time permit the shoes of the block 135 to move in a horizontal plane to the right. As the lower end of the leg 115 of the rocker arm 38 moves to the left, the bushing around the locked stud 127 rotates thereon to permit this movement to the left in an upward direction of the leg 115 of the rocker arm 38.

The movement to the right of the reciprocating shaft 112 continues until the nose 157 of the cam follower 156 reaches the base 200 of the cam face 29 of the cam member 28 in which position the distributing bar 112 is in its extreme right position with reference to Fig. 4. The nose 157 of the cam follower 156 now engages the pitch face 30 of the cam member 28, causing the nose 157 to follow the contour of the cam face 30, thus forcing the sliding member 37 and its supported pivoted rocker arm 38 to the left, causing the upper end to swing to the left to cause the shoes to move to the left in their respective channels. This movement of the rocker arm 38 and its associated parts continues to the left until the nose 157 of the cam follower 156 reaches the apex 201 of the cam 28 and the instant that the nose 157 of the cam follower 156 passes the apex 201, the cam face 29 of the cam member 28 is again engaged and the sliding members 37 and its pivoted rocker arm 38 and its associated parts again move to the right with reference to Fig. 4, under tension of the compressed spring 158.

From the above description it may be seen that the tilting of the upper end of the rocker arm 38 from left to right, and vice versa, causes the shoes to travel in a like direction, and as the reciprocating shaft 112 is secured to the shoe 137, the said reciprocating shaft 112 also receives this to and fro movement. It will also be seen that the rotation of the cam member 28, through the agency of the cam follower 156, sliding member 37, the rocker arm 38 and the shoes brings about the movement of the reciprocating shaft 112 from left to right, and vice versa, and that for one complete revolution of the cam member 28, the reciprocating shaft 112 will have traveled from left to right and from right to left, and as the distributing arm 164 is secured to the shaft 112, two layers of convolutions of wire have been placed on the spool gripped by the chuck K secured to the spindle shaft 3.

The pinion 58 on the shaft 57 in combination with the gears 77 and 78 of the compound gear G rotatably supported by the hanger 60 and the gear 56 on the shaft 53 causes the shaft 53 to rotate and through the agency of the bevel pinion 52 on the shaft 53 and bevel gear 50 on the shaft 33, the shaft 33 is rotated at a certain speed. The rotation of the cam 28 on the shaft 33 through the agency of the cam follower 156 causes the reciprocating shaft 112 to move from left to right and vice versa to place a certain number of turns per inch of a predetermined gauge of wire on the spool supported by the chuck K on the winding spindle 3. This combination of gears just described is adapted for use in winding a coil in which a certain gauge of wire is used so that the gear combination will drive the shaft 33 supporting the cam 28 at a certain speed so that the wire will be placed on the spool at a predetermined number of convolutions per inch.

The winding machine of my invention as just described in combination with the multiple gear change gives the machine flexibility so that by the simple expedient of shifting the lever L from one position to another coils of different gauges of wire may be wound on the machine and in combination with the adjustable feature of being able to change the stroke of the reciprocating shaft 112 in its travel from left to right and vice versa coils of different length, and of different gauge wire may be wound on the machine. The gear changing feature as just described is provided with three positions A, B and C and having described in detail the operation of the apparatus when the lever L is moved to position A, I will now describe briefly how the lever L is shifted from its position A to its position B to permit a wire of a different gauge to be used than that applicable for use when the lever L is in position A.

To move the lever L from its position A to B, the finger extension 210 of the trigger 99 is engaged by the finger of the operator and raised until the lug 101 of the trigger 99 is clear of the slot 93. When in this position, the lever may be moved to the right to the position as illustrated in Fig. 7. The lever L when moved to the right causes its depending lug 180 to move to the left with reference to Fig. 7 causing it to disengage the face 181 of the hanger 60. The spring 74 which was placed under tension when the hanger 60 was moved to the right as before described now restores the hanger 60 to its normal position in engagement with the stop 68 and this movement of the hanger 60 causes the gear 78 to disengage the gear 56 on the transverse shaft 53. The lever L may now be moved along the rod 90 until its protruding rod portion 90′ is in line with the notch 97 in the slot 93. When the lever L is in this position it may now be moved to the left with its rod extension 90′ entering the notch 97 and the trigger 99 will again move down with its lug 101 entering the slot 93 to hold the lever L in its position B. The depending member 180 engages the hanger 61 when the lever L is moved to the left to move the hanger 61 to the right against the normal tension of the spring 75 to place the gear 81 rotatably supported by the hanger 61 into engagement with the gear 56′ on the shaft 53. This causes the shaft 53 to rotate and through the medium of the bevel pinion 52 and bevel gear 50 the shaft 33 is rotated at a certain speed causing the reciprocating shaft 112 to move at a predetermined speed to place a predetermined number of convolutions of a certain gauge wire on the spool supported by the chuck K on the spindle shaft 3.

From the foregoing it is readily apparent that through the medium of a gear shift lever L in combination with the gears 78, 81 and 84 and gears 56, 56′ and $56^2$ the winding machine of my invention is made flexible in that a number of different gauges of wire are adapted to be wound by the novel arrangement of this gear shifting lever and combination of gears.

While I have described one particular embodiment of my invention, it is to be understood that the same is not limited to the disclosure, but is to cover all the changes and modifications that come within the spirit and scope of the appended claims.

What I claim as new and desire to secure by United States Letters Patent is:

1. A machine of the character described including a rotatable shaft, a transverse shaft and a plurality of pinions secured to said transverse shaft, means connecting said rotatable shaft and said transverse shaft for rotating said transverse shaft, a plurality of hangers pivotally supported on said transverse shaft, gears rotatably supported by said hangers engaging said pinions and adapted to be driven by said pinions, a second transverse shaft, a plurality of gears rotatably supported on said second shaft, and means including a slidably supported lever adapted to be moved into engagement with said hangers for moving the gears supported by said hangers into engagement with said gears on said second transverse shaft for driving the same.

2. A winding machine of the character described including a rotatable shaft, a worm on said rotatable shaft, a transverse shaft and a worm gear secured thereto in engagement with said worm for rotating said transverse shaft, a plurality of pinions secured to said transverse shaft, a plurality of hangers pivotally supported on said transverse shaft, gears rotatably supported by said hangers in engagement with said pinions, a second transverse shaft, a plurality of gears secured to said second shaft, means including a slidably supported lever adapted to be moved into engagement with said hangers for moving said hangers to place said gears rotatably supported thereby into engagement with said gears on said second transverse shaft to drive said second transverse shaft, and a member slidably supported on said lever for maintaining said lever and said hangers in any adjusted position.

3. A machine of the character described including a rotatable shaft, a worm on said shaft, a transverse shaft and a worm gear secured thereto in engagement with said worm for rotating said transverse shaft, a plurality of pinions secured to said transverse shaft, a second transverse shaft and a plurality of gears secured thereto, a plurality of hangers pivotally secured to said first transverse shaft and gears, in engagement with said pinions, rotatably supported by said hangers, means including a slidably supported lever for moving said hangers to place said gears rotatably supported thereby into engagement with said gears on said second transverse shaft, said rotatable shaft adapted to rotate said second transverse shaft through said gears, means for normally maintaining the gears on said hangers out of engagement with said gears on said second shaft, and a member slidably supported on said lever for maintaining said lever and said hangers in any adjusted position.

4. A machine of the character described including a transverse shaft, a plurality of hangers pivotally supported on said transverse shaft, gears rotatably supported by said hangers, a second transverse shaft and a plurality of gears secured thereto, a lever slidably supported and adapted to be moved into engagement with any of said hangers to place the rotatable gears of the same into engagement with the gears on said second transverse shaft.

5. A machine of the character described including an enclosing casing, a transverse shaft and a plurality of pinions secured thereto, a plurality of hangers pivotally supported on said transverse shaft, gears rotatably supported by said hangers in engagement with said pinions, a second transverse shaft and a plurality of gears secured thereto, a rod secured to said casing, a lever loosely supported on said rod and adapted to be moved into engagement with any of said hangers to place the gear rotatably supported thereby in engagement with one of said gears on said second transverse shaft, and means for maintaining said gears in engagement.

6. A machine of the character described including an enclosing casing, a transverse shaft, a plurality of hangers pivotally supported on said transverse shaft, gears rotatably supported by said hangers, a second transverse shaft and a plurality of gears secured thereto, a rod secured to said casing and a lever slidably supported thereon, said lever being adapted to be moved into engagement with any of said hangers to move the same to place the gear rotatably supported thereon into engagement with the gear on said second transverse shaft associated with said gear of said hanger engaged by said lever.

7. A machine of the character described including an enclosing casing, a transverse shaft, a plurality of hangers pivotally supported on said transverse shaft, gears rotatably supported by said hangers and a second transverse shaft and a plurality of gears secured thereto, a rod secured to said casing and a lever slidably supported thereon, said lever being adapted to be moved into engagement with any of said hangers to move the same to place the gear rotatably supported thereon into engagement with the gear on said second transverse shaft associated with said gear of said hanger engaged by said lever, and means on said lever and said casing for locking said lever in actuated position.

8. A device of the character described including a rotatable shaft and driving means connected to one end thereof, a transverse shaft and pinions secured thereto, gearing means connecting said transverse shaft with said rotatable shaft, hangers pivotally secured to said transverse shaft and gears supported by said hangers in engagement with said pinions, a second transverse shaft and gears secured thereto operatively associated with said gears rotatably supported by said hangers, spring means for each of said hangers for maintaining said gears rotatably supported by said hangers normally disengaged from said gears on said second transverse shaft, means including a slidably supported lever adapted to be moved into engagement with each of said hangers for differently associating said gears in said hangers with said gears on said second transverse shaft, an enclosing casing for said mechanism, a cover cap therefor having a plurality of connected slots, a trigger member slidably supported on said lever adapted to enter said slots to maintain said lever and said hangers in any adjusted position.

9. A device of the character described including a rotatable shaft and driving means connected to one end thereof, a transverse shaft and pinions secured thereto, gearing means connecting said transverse shaft with said rotatable shaft, a second transverse shaft and gears secured thereto, hangers pivotally supported on said first transverse shaft and sets of gears supported by said hangers and normally disconnected from said gears on said second transverse shaft, means including a slidably supported lever adapted to be moved into engagement with said hangers for moving any of said hangers to place said gears supported thereon into engagement with its associated gear on said second transverse shaft, and a member slidably supported on said lever for maintaining said lever and said hangers in any adjusted position.

10. A device of the character described including a rotatable shaft and driving means connected to one end thereof, a transverse shaft and pinions secured thereto, gearing means connecting said transverse shaft with said rotatable shaft, a second transverse shaft and gears secured thereto, hangers pivotally supported on said first transverse shaft and sets of gears supported by said hangers and normally disconnected from said gears supported on said second transverse shaft, an enclosing casing for said mechanism, a cover cap fitted on said casing, means including a slidably supported lever adapted to be moved into engagement with said hangers for moving any of said hangers to place said gears supported thereon into engagement with its associated gear on said second transverse shaft, a transverse slot and a plurality of slots at right angles to said transverse slot in said cover cap, a portion of said slidable lever adapted to enter said slot, and a trigger member on said lever adapted to fit in any of said slots to maintain said lever in any adjusted position.

11. A device of the character described including a rotatable shaft and driving means connected to one end thereof, a transverse shaft and pinions secured thereto, gearing means connecting said transverse shaft with said rotatable shaft, a second transverse shaft and gears secured thereto, hangers pivotally supported on said first transverse shaft and sets of gears supported by said hangers in engagement with the pinions on said first transverse shaft, spring means for maintaining said hangers and the supported gears normally disconnected from said gears on said second transverse shaft, a cover cap for said mechanism, said cap having a transverse slot and a plurality of slots at right angles to and connected with said transverse slot, a lever having a portion adapted to be moved in said slots for differently associating said gears of said hangers with said gears on said second shaft, and a trigger member secured to said lever and adapted to be secured in any of said slots to maintain said lever in its adjusted position.

12. A device of the character described including a transverse shaft, pinions secured to said shaft, and hangers supported on said transverse shaft and gears rotatably supported by said hangers, said pinions being meshed with gears supported by said hangers, a second transverse shaft and gears spaced thereon, a lever for differently associating the said gears of said hangers with the gears of said second transverse shaft, and means including a trigger member associated with said lever and slidably supported thereon for locking said actuated hanger in position and spring means for restoring said hanger and gear from engagement with its associated gear on said transverse shaft when said lever is moved to its unlocked position.

Signed by me at Chicago, in the county of Cook, and State of Illinois, this 29th day of June, 1925.

MARTIN B. GROUT.